US006898902B1

(12) United States Patent
Stoffers et al.

(10) Patent No.: US 6,898,902 B1
(45) Date of Patent: May 31, 2005

(54) GREENHOUSE AS WELL AS ROOF ELEMENT FOR SUCH A GREENHOUSE HAVING INCREASED LIGHT TRANSMISSION

(75) Inventors: Johannes Andreas Stoffers, Kesteren (NL); Pieter Jan Sonneveld, Wageningen (NL)

(73) Assignee: Instituut voor Milieu- en Agritechniek (IMAG) B.V., Wageningen (NL)

( * ) Notice: Subject to any disclaimer, the term of this patent is extended or adjusted under 35 U.S.C. 154(b) by 0 days.

(21) Appl. No.: 10/049,854

(22) PCT Filed: Aug. 17, 2000

(86) PCT No.: PCT/NL00/00574

§ 371 (c)(1),
(2), (4) Date: May 21, 2002

(87) PCT Pub. No.: WO01/13704

PCT Pub. Date: Mar. 1, 2001

(30) Foreign Application Priority Data

Aug. 19, 1999  (NL) .............................................. 1012866

(51) Int. Cl.⁷ ................................................ E04B 7/12
(52) U.S. Cl. ........................... 52/18; 52/220.4; 52/90.2; 52/643; 47/17
(58) Field of Search ................................ 52/90.1, 90.2, 52/220.4, 643; 47/17

(56) References Cited

U.S. PATENT DOCUMENTS

| 3,266,201 A | * | 8/1966 | Christ-janer |  |
|---|---|---|---|---|
| 3,591,991 A | * | 7/1971 | Zetlin | 52/18 |
| 4,320,603 A | * | 3/1982 | Kirschen | 52/18 |
| 4,671,025 A |   | 6/1987 | Butler |  |

FOREIGN PATENT DOCUMENTS

| DE | 34 04 935 | 8/1985 |
|---|---|---|
| GB | 2 256 209 | 12/1992 |
| NL | 7 809 424 | 3/1980 |

* cited by examiner

Primary Examiner—Carl D. Friedman
Assistant Examiner—Yvonne Horton
(74) Attorney, Agent, or Firm—Young & Thompson

(57) ABSTRACT

Greenhouse (1) provided with a roof element (2) having a multiplicity of transverse ribs (12, 13, 14, 15) or pyramids uniformly distributed over the roof element. The roof element can be constructed double-walled as a hollow-core sheet from transparent plastic and can comprise a base sheet with the rib-shaped or pyramid-shaped roof surfaces fixed thereon. The light yield in a horticultural greenhouse can be increased by the roof elements.

25 Claims, 3 Drawing Sheets

GREENHOUSE AS WELL AS ROOF ELEMENT FOR SUCH A GREENHOUSE HAVING INCREASED LIGHT TRANSMISSION

BACKGROUND OF THE INVENTION

The invention relates to a greenhouse having a transparent roof construction with a longitudinal direction and a transverse direction located perpendicularly thereto, having various pairs of first roof surfaces in succession in the transverse direction, the first roof surfaces of a predetermined pair running at an angle with respect to a horizontal from a base edge oriented in the longitudinal direction of the greenhouse to a common apex. The invention also relates to a roof element for use in such a greenhouse.

It is known from the publication entitled "Second International Symposium on Models for Plant Growth", Environmental Control and Farm Management in Protected Cultivation, number 456, March 1998, to provide horticultural greenhouses with roof surfaces in succession in the transverse direction which run in the shape of a point towards an apex. For angles to the horizontal of greater than 45° the light transmission for radiation which is incident perpendicularly on the greenhouse is found to increase substantially. This is particularly important in horticultural greenhouses since one per cent more light yield results in approximately one percent more yield of crops.

SUMMARY OF THE INVENTION

An aim of the present Invention is to provide a roof construction of the above-mentioned type, provided with a quantity of pairs of roof surfaces which are laid in contact with one another and come together in an apex, the light transmission being increased.

To this end the roof construction according to the present invention is characterised in that the greenhouse is also provided with pairs of successive second roof surfaces in the longitudinal direction, which second roof surfaces run at an angle with respect to the horizontal from a base edge oriented in the transverse direction of the greenhouse to a common apex.

It has been found that a zigzag or ribbed pattern of the roof surfaces extending in two perpendicular directions is able to increase the light yield by 10%–20% compared with roof constructions Which are of zigzag construction only in the transverse direction. In a first embodiment the pairs of roof surfaces form pyramids which are joined to one another along their sides to give a continuous roof construction.

In another embodiment of a greenhouse according to the invention the pairs of first roof surfaces are in contact with one another along edges at the apex, wherein base edges and the edges at the apex of the pairs of first roof surfaces extend parallel to one another in the longitudinal direction, wherein the pairs of second roof surfaces are in contact with one another along edges at the apex and wherein the base edges and the edges at the apex of the second pairs of roof surfaces extend parallel to one another from a base edge of a first roof surface to the edge at the apex of the first roof surface concerned. By this means successive transverse ribs are formed in the longitudinal direction of the greenhouse.

It is preferable to construct roof elements with a zigzag pattern double-walled as a hollow-core sheet so that, on the one hand, adequate strength and insulating effect of the roof construction is obtained whilst, on the other hand, the light transmission is increased. The double-walled roof elements comprise a base surface made of, for example, polycarbonate with a thickness of 0.8 mm on which a zigzag-shaped sheet with ribs approximately 20 mm high is fixed. Preferably, the double-walled roof element is made in one piece. The roof elements can be of modular construction and are provided with coupling means for joining to similar roof elements.

BRIEF DESCRIPTION OF THE DRAWINGS

A greenhouse according to the present invention and a roof element will be explained in more detail below with reference to the appended drawing. In the drawing.

DESCRIPTION OF THE PREFERRED EMBODIMENTS

Figure 1:
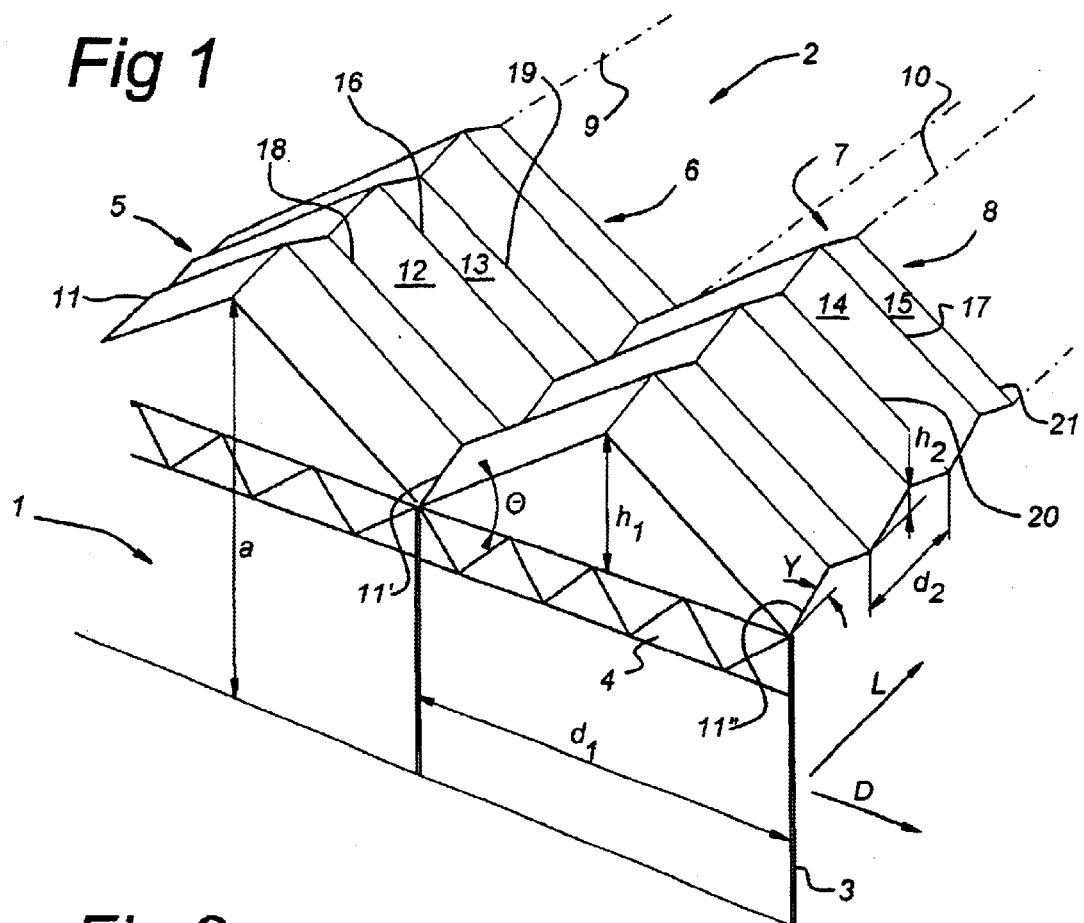
FIG. 1 shows a diagrammatic, perspective view of a roof with a roof construction that is in zigzag form in the transverse direction and the longitudinal direction.

FIG. 1 shows a greenhouse 1, such as, for example, a greenhouse of the Venlo type having a transparent roof construction 2. The roof construction 2 is supported on uprights 3 and horizontal lattice girders 4, which are shown here diagrammatically only. The height a of a greenhouse as shown in FIG. 1 is, for example, 4 m, whilst the width, $d_1$ in the transverse direction D, is 8 m for a length in the longitudinal direction L of, for example, 100 m. The roof construction 2 comprises pairs of first roof surfaces 5, 6; 7, 8, which run from a base edge 11, 11', 11" at an an angle θ approximately 20° with respect to the horizontal and which are fixed to one another along a respective apex 9, 10. The height $h_1$ of the apex 9, 10 above the lattice girder 4 is, for example, 1.45 m. In the longitudinal direction L the pairs of roof surfaces 5, 6; 7, 8 are provided with transverse ribs, formed by pairs of second roof surfaces 12, 13; 14, 15. The roof surfaces 12, 13; 14, 15 run at an angle γ from base edges 18, 19; 20, 21 and are joined to one another along edges at the apex 16, 17. The distance $d_2$ between the base edges 18, 19; 20, 21 of the pairs of second roof surfaces 12, 13; 14, 15 is, for example, 2 cm, whilst the height $h_2$ of the edge at the apex 16, 17 above the plane of the base edges 18, 19; 20, 21 is 1.7 cm. As a result of fitting the pairs of zigzag-shaped second roof surfaces 12, 13; 14, 15 the light yield is increased by approximately 10% for a single layer roof construction and by approximately 20% for a double layer roof construction as is shown in FIG. 3 and FIG. 4, compared with known greenhouses where only pairs of first roof surfaces 5, 6; 7, 8 are present.

Figure 2:
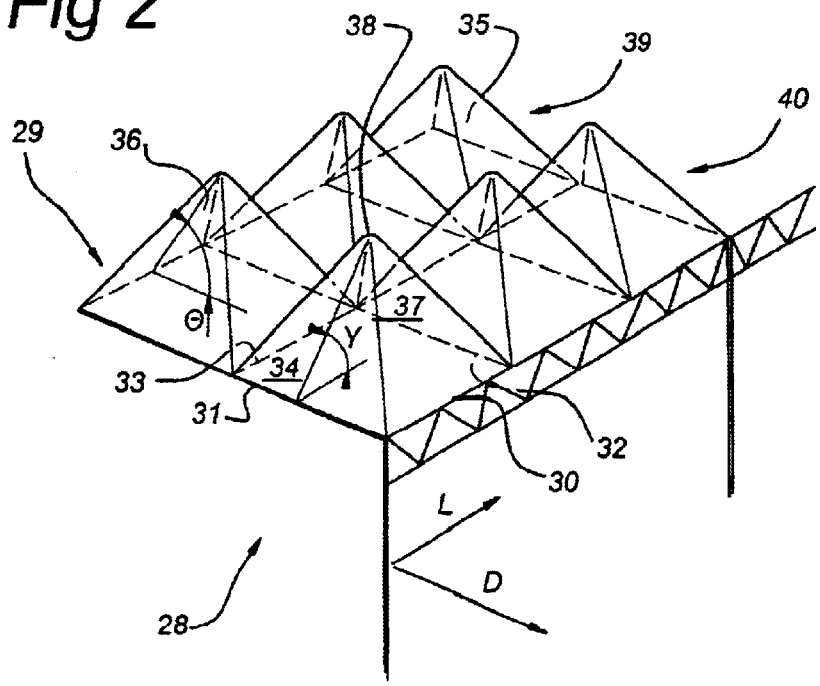
FIG. 2 shows a diagrammatic, perspective view of a roof construction formed from a series of pyramids.

FIG. 2 shows an embodiment of a greenhouse 28 having a roof construction 29 in which the base edges 30, 31, 32, 33 of pairs of first roof surfaces 34, 35 and pairs of second roof surfaces 36, 37 delimit rectangles in contact with one another, above which the roof surfaces 34, 35; 36, 37 come together in an apex 38, so that a multiplicity of pyramids 39, 40 is formed to increase the light yield. Here the length of the base edges 31, 32 is approximately 1 m, whilst the height of the pyramids is 1.7 m.

Figure 3:
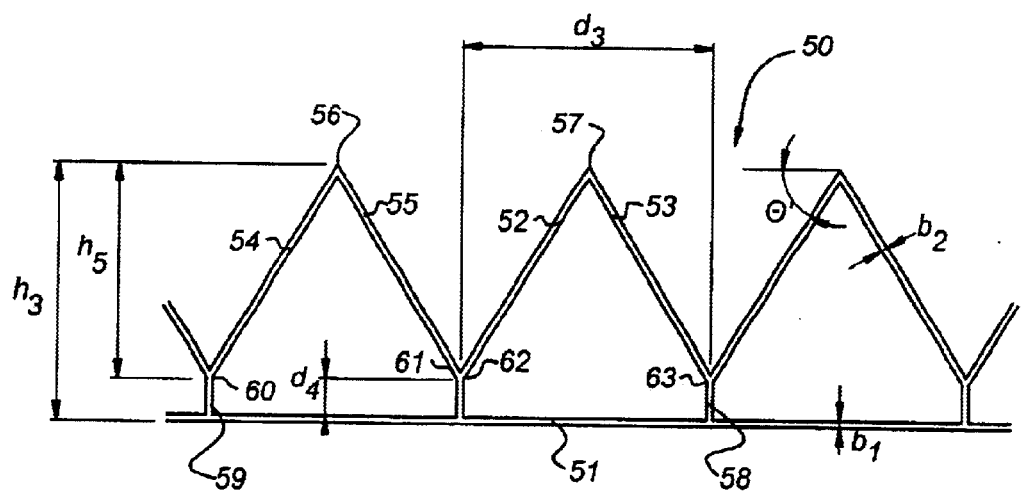
FIG. 3 shows a cross-section of a double-walled roof element in the form of a hollow-core sheet according to the present invention.
Figure 4:
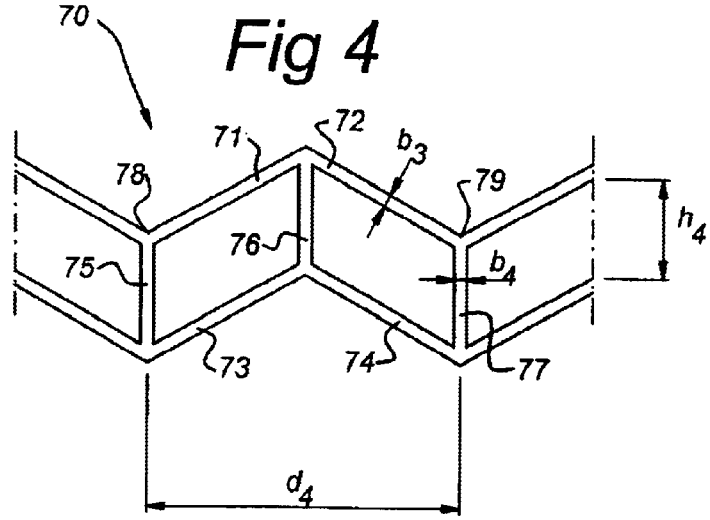
FIG. 4 shows an alternative embodiment of a double-walled roof element in the form of a hollow-core sheet according to the invention.

FIG. 3 shows an embodiment of a double-walled roof element 50 in the form of a hollow-core sheet having a base sheet 51 and pairs of roof surfaces 52, 53, 54, 55 which are joined to one another along edges at the apex 56, 57 extending perpendicularly to the plane of the drawing. The base edges 60, 61, 62, 63 are joined via partitions 58, 59 to the base sheet 1: The thickness $b_1$ of the base sheet is, for example, 0.8 mm, the thickness $b_2$ of the surfaces 52, 53, 54, 55 is, for example, 1 mm, the height $h_3$ is, for example, 28 mm, whilst the distance $d_3$ between the base edges 60, 61, 62, 65 is, for example, 16 mm. The height $h_5$ is 13.9 mm.

The angle θ of the roof surfaces 52, 53, 54, 55 to the horizontal is 60°. The material of the double-walled roof element 50 is, for example, polycarbonate, but this element can if also be made from any other suitable transparent plastic.

FIG. 4 shows an alternative embodiment of a double-walled roof element 70 having roof surfaces 71, 72, which are positioned at an angle, and base surfaces 73, 74, which are likewise positioned at an angle and which are joined to one another by partitions 75, 76, 77. The thickness $b_3$ of the roof surfaces 71, 72 is, for example, 1 mm, the distance $h_4$ between the roof surfaces 71, 72 and the base surfaces 73, 74 is, for example, 20 mm and the thickness $b_4$ of the partition 77 is, for example, 0.8 mm. The distance $d_4$ between the base edges 78, 79 is, for example, 30 mm.

Figure 5:
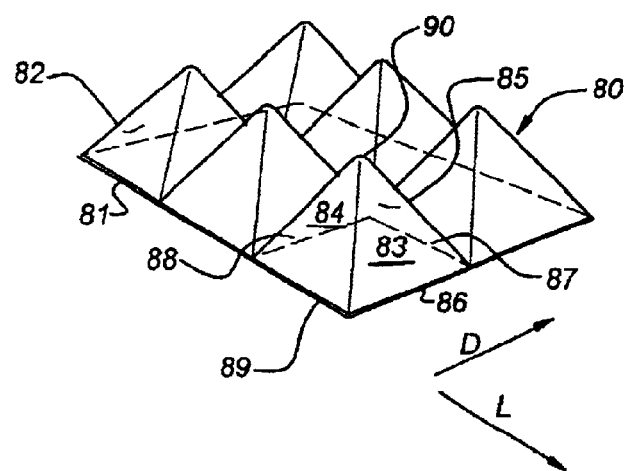
FIG. 5 shows a double-walled roof element formed by a series of pyramids.

FIG. 5 shows an embodiment of a roof element 80 made from one piece of transparent plastic and having a base sheet 81. Four surfaces 82, 83, 84, 85 extend along four base edges 86, 87, 88, 89 of the base sheet 81 to a common apex 90. In this way a multiplicity of pyramids uniformly distributed over the base sheet 81 are formed. Here the length of the base edges 86, 87, 88, 89 is, for example, 1.5 m and the distance from the apex 90 to the base sheet 81 is 2.6 m.

Figure 6:
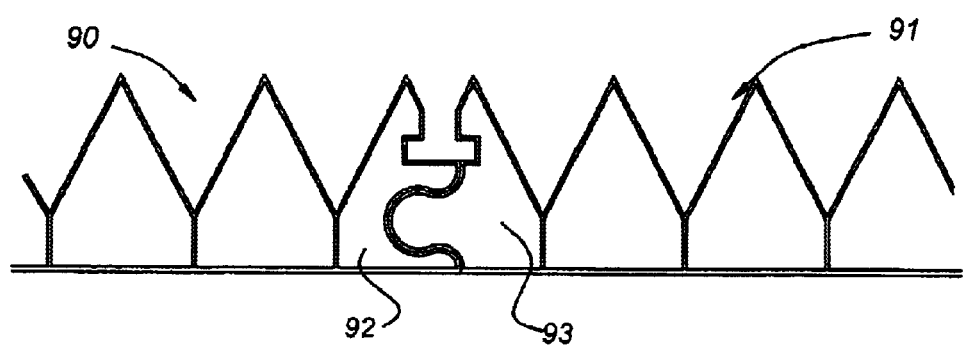
FIG. 6 shows two roof elements joined to one another by means of coupling means.

Finally, FIG. 6 shows two roof elements 90, 91 which are joined to one another via complementary fixing means 92, 93 which engage in a simple manner and in modular fashion form a roof construction according to the present invention.

What is claimed is:

1. A roof panel for a greenhouse roof, the panel comprising:
plural pairs of transparent roof subpanels (12, 13), said roof subpanels of each of said pairs meeting along a respective apex (16) that runs at a first non-zero angle (θ) from horizontal when installed in a greenhouse roof, said roof subpanels sloping away from said apex at a second non-zero angle (γ) that remains constant along a length of said apex, said apexes being parallel to each other, each of said pairs of roof subpanels meeting an adjacent one of said pairs along a respective nadir (18) that runs at the first non-zero angle from horizontal, said nadirs being parallel to said apexes,
each of said roof subpanels comprising a roof sheet (71) and a base sheet (73) that are separated from each other by a first non-zero distance ($h_4$), said roof sheet and said base sheet being parallel to each other and connected to each other with partitions (75, 76).

2. The roof panel of claim 1, wherein said partitions extend vertically and connect said roof sheet to said base sheet only at said apex and said nadir.

3. The roof panel of claim 1, wherein said nadirs are separated from each other by a distance that is from 1 cm to 10 cm.

4. The roof panel of claim 1, wherein said nadirs are separated from each other by a distance that is from 1.5 cm to 3 cm.

5. The roof panel of claim 1, wherein the first non-zero distance is from 1 cm to 10 cm.

6. The roof panel of claim 1, wherein the first non-zero distance is from 1.5 cm to 3 cm.

7. The roof panel of claim 1, wherein said nadirs are separated from each other by a distance that is from 1.5 cm to 3 cm, and wherein the first non-zero distance is from 1.5 cm to 3 cm.

8. The roof panel of claim 1, wherein said roof panel comprises transparent plastic 0.5 mm to 5 mm thick.

9. The roof panel of claim 1, wherein said roof panel comprises transparent plastic 0.5 mm to 2 mm thick.

10. A greenhouse roof with a longitudinal direction (L) and a transverse direction (D) perpendicular thereto, the roof comprising:
plural pairs of transparent roof surfaces (5, 6, 7, 8) in succession in the transverse direction, the roof surfaces of each pair of the plural pairs of roof surfaces meeting adjacent to a respective first apex (9, 10), each of the roof surfaces extending from adjacent to a respective base edge (11) at a first non-zero angle (θ) from a horizontal extending in the transverse direction, each said first apex and each said base edge extending in the longitudinal direction; and
each of the roof surfaces comprising plural pairs of roof subpanels (12, 13) in succession in the longitudinal direction, the roof subpanels of each pair of the plural pairs of roof subpanels meeting along a respective second apex (16) that runs at the first angle from the horizontal and extends from adjacent to a respective said base edge to a respective said first apex, each of the roof subpanels lying at a second non-zero angle (γ) relative to a horizontal extending in the longitudinal direction, wherein said roof subpanels of one said roof surface meet said roof subpanels of an adjoining said roof surface adjacent to said first apex along two edges that slope away from said first apex at the second angle (γ) relative to the horizontal wherein said roof surfaces are double-walled.

11. The roof of claim 10, further comprising a base sheet that is attached to said roof surfaces with links.

12. The roof of claim 11, wherein said base sheet is flat and said links are attached to each said peak.

13. The roof of claim 11, wherein said base sheet is flat and said links are attached to said base sides.

14. The roof of claim 11, wherein said base sheet has plural base surfaces that are each generally parallel to an adjacent one of said roof surfaces.

15. The roof of claim 11, wherein a distance ($h_4$) between said base sheet and said second apex is from 1 cm to 10 cm.

16. The roof of claim 11, wherein a distance ($h_4$) between said base sheet and said second apex is from 1.5 cm to 3 cm.

17. The roof of claim 10, wherein a distance ($d_2$, $d_3$, $d_4$) between edges of said pairs of roof subpanels is from 1 cm to 10 cm.

18. The roof of claim 17, wherein the distance ($d_2$) between edges of said pairs of roof subpanels is from 1.5 cm to 3 cm.

19. The roof of claim 11, wherein a distance ($h_4$) between said base sheet and said second apex is from 1.5 cm to 3 cm, and wherein the distance ($d_2$) between edges of said pairs of roof subpanels is from 1.5 cm to 3 cm.

20. The roof of claim 10, wherein the first angle is from 30° to 75°.

21. The roof of claim 20, wherein the first angle is from 45° to 75°.

22. The roof of claim 10, wherein said roof subpanels comprise transparent plastic 0.5 mm to 5 mm thick.

23. The roof of claim 22, wherein said transparent plastic is 0.5 mm to 2 mm thick.

24. The roof of claim 10, wherein a distance ($d_2$) between edges of said pairs of roof subpanels is between 0.5 and 0.001 times a distance ($d_1$) between the base edges of the transparent roof surfaces.

25. The roof of claim 10, wherein a height ($h_2$) of the second apex relative to the base edge (11) is between 0.5 and 0.001 times a height ($h_1$) of the first apex relative to the base edge (11).

* * * * *